3,303,877
HEAT EXCHANGER
Torsten Ramén, Stockholm, Sweden, assignor to Ramén Corporation a.-b., Stockholm, Sweden, a corporation of Sweden
Filed June 1, 1964, Ser. No. 371,729
Claims priority, application Sweden, June 5, 1963, 6,227/63; Oct. 2, 1963, 10,774/63
3 Claims. (Cl. 165—154)

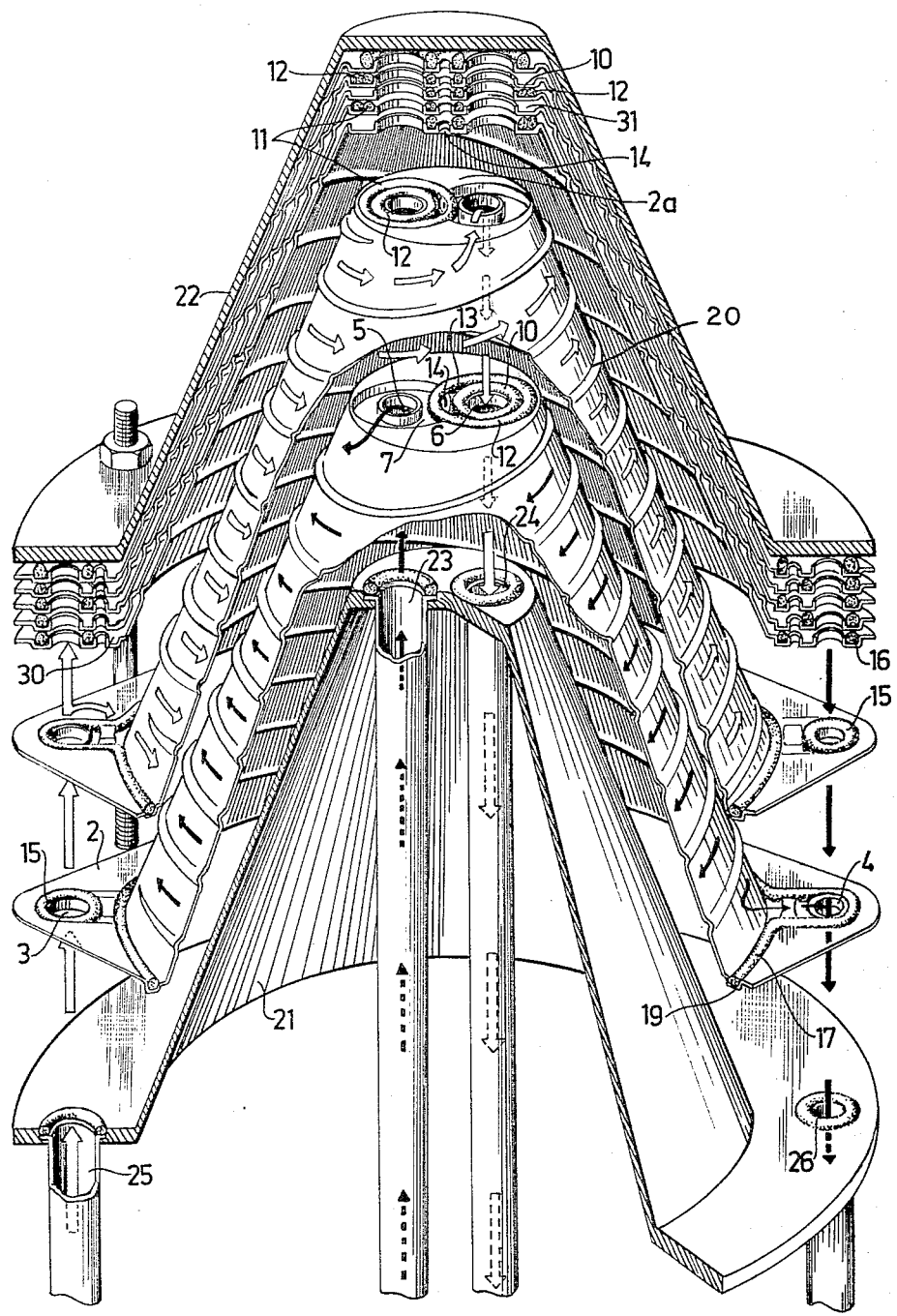

The present invention relates to a heat exchanger of the type comprising an assembly of a plurality of similar elements, which define flow passages for the two media subjected to heat exchange, one of said media flowing through each second space between said elements and the other one flowing through the remaining spaces.

The main object of the present invention is to provide a heat exchanger of this type, wherein the elements are better adapted to withstand internal pressure. This object is achieved by making the elements frustoconical.

Another object is to provide a heat exchanger of the type referred to having frustoconical elements, which are less expensive in manufacture than known elements.

Other objects and advantages will become apparent as the description proceeds.

The invention will be described more in detail with reference to the accompanying drawing, which shows an embodiment thereof in exploded view.

As seen from the drawing, the heat exchanger in accordance with this invention comprises an assembly of identically similar sheet metal elements, each consisting of a frustrum of a cone 1, which is integral with a brim 2 provided at the larger end of the cone and with an end-plate 2a at the small end of the cone, the thickness of said brim and said end plate being greater than that of the sheet of the cone 1. In the brim 2 of each element, openings 3, 4 are provided at two diagonally opposed corners, and in the end plate 2a there are provided similar openings 5, 6, such openings serving for entry and exit of the two media. Provided around the openings 5, 6 are channels 7 for sealing rings, and in each second space between the elements, sealing rings 10 are inserted in the channels 7 around the openings 5 and in the remaining spaces sealing rings 11 are provided around the openings 6 in the channels 7. Thus, the openings 5 communicate with each second space between the elements, and the openings 6 communicate with the remaining spaces. Furthermore, outer sealing rings 12 are positioned around each of the sealing rings 10 and 11 so that annular passages 13 are formed between each sealing ring 12 and each sealing ring 10 or 11. These passages communicate with each other through central orifices 14 in the end plates. Thus, a central conduit is formed through the assembly of elements and can serve as a means for determining the presence of any leakage at any one of the sealing rings 10 and 11.

In a similar manner, the openings 3 and 4 are sealed against each second space by means of sealing rings 15 provided in channels 16. Also, sealing rings 17 are positioned in channels 19 around the base of each cone and serve to seal the spaces between the elements outwardly. As seen from the drawing, these sealing rings 17 also surround those openings 3, 4, which do not have sealing rings 15 around them. Thus, in each second element, the opening 3 and in the remaining elements the opposed opening 4 communicate with the space between the elements.

Each element is readily manufactured from a flat sheet of uniform thickness by forming the frustoconical portion 1 by pressure-turning, whereby the conical portion will obtain a smaller thickness than the unchanged sheet portions around the base of the cone, which portions form the brim 2, and the sheet portions inside of the cone, which portions form the end plate 2a. This is a simple method of manufacture, which also results in a desirable increased material thickness in the flat portions of the elements to provide an increased strength thereof, as compared to the conical portions of the elements.

It is also to be noted that the spaces 30 between the brims 2 and the spaces 31 between the end plates 2a are wider than the spaces between the cones 1, which is favorable as regards the flow characteristics.

Formed in each cone 1 is a helical ridge 20, which engages the adjacent cone so that the space between them forms a helical flow path to achieve the flow indicated by arrows in the drawing. Suitably, the ridges are offset in adjacent elements, so that the ridge of each element engages the smooth sheet portion between adjacent turns of the ridge of the adjacent element, as seen most clearly in the top portion of the figure.

The elements 1 are positioned between two frustoconical end walls 21, 22. The lower one has openings 23, 24, 25, 26, to which inlet and outlet conduits for the two media are connected.

The conical shape of the elements in combination with the helical ridge gives a long flow path for each medium together with a very strong construction.

If desired, the ridge 20 can be replaced by a strip, which is wound around the cone and attached in any suitable manner.

In some cases, it may be suitable to make only the passages for one medium with a helical flow path, while the passages for the other medium have no such means, this in particular when the last-mentioned medium is vaporous or gaseous.

I claim:
1. A heat exchanger comprising a plurality of superimposed frusto conical elements each having a frusto conical portion, a brim extending from the larger end of the frusto conical portion, and an end plate covering the smaller end of the frusto conical portion, the thickness of said brim and end plate being greater than that of said frusto conical portion, the outer surface of each of said frusto conical portions being provided with a helically extending ridge extending from the brim to the end plate and abutting the smooth inner surface of the frusto conical portion of an adjacent element to define a helical flow path between said elements; a first inlet and outlet conduit extending through the brim of the innermost element; a second inlet and outlet conduit extending through the end plate of said innermost element; a pair of openings formed in the brim and in the end plate of each of said elements, a series of said openings being aligned in registration with a corresponding conduit, a channel formed around said openings; a plurality of sealing rings disposed in a portion of said channels, said rings being shaped and arranged to direct fluid flow from said first inlet through alternate flow paths to said second outlet and from said second inlet through the other flow paths to said first outlet.

2. The heat exchanger of claim 1, wherein a first portion of said rings are adapted to prevent fluid flow from their corresponding holes to the corresponding flow path, and a second portion of said rings are adapted to permit such flow while sealing the space between the elements.

3. The heat exchanger of claim 1, wherein the space between adjacent elements is greater at the brim and at the end plate than at the frusto conical portions.

References Cited by the Examiner

UNITED STATES PATENTS

| | | | |
|---|---|---|---|
| 964,410 | 7/1910 | Fox | 165—155 |
| 1,914,084 | 6/1933 | Ellis et al. | 165—90 X |
| 2,169,601 | 8/1939 | Cornelius et al. | 165—90 X |
| 2,183,509 | 12/1939 | Smith | 165—147 X |
| 2,488,549 | 11/1949 | MacCracken | 165—147 |
| 3,092,180 | 6/1963 | Dahlgren | 165—88 |

FOREIGN PATENTS

| | | |
|---|---|---|
| 1,322,386 | 2/1963 | France. |
| 865,144 | 1/1953 | Germany. |

ROBERT A. O'LEARY, *Primary Examiner.*
FREDERICK L. MATTESON, Jr., *Examiner.*
T. W. STREULE, *Assistant Examiner.*